(12) United States Patent
Perkins et al.

(10) Patent No.: US 8,594,265 B2
(45) Date of Patent: Nov. 26, 2013

(54) METHODS FOR CONTROLLING ION BEAM AND TARGET VOLTAGE IN A NEUTRON GENERATOR FOR IMPROVED PERFORMANCE

(75) Inventors: Luke T. Perkins, Plainsboro, NJ (US); Peter Wraight, Skillman, NJ (US); Wolfgang P. Ziegler, Hightstown, NJ (US); Robert A. Adolph, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 475 days.

(21) Appl. No.: 12/040,272

(22) Filed: Feb. 29, 2008

(65) Prior Publication Data
US 2009/0219028 A1    Sep. 3, 2009

(51) Int. Cl.
*G21G 4/02* (2006.01)
*G01V 5/10* (2006.01)
*H05H 6/00* (2006.01)

(52) U.S. Cl.
USPC ........ 376/119; 376/114; 250/269.4; 315/506; 315/507; 324/333

(58) Field of Classification Search
USPC ........................................... 376/119
See application file for complete search history.

(56) References Cited

U.S. PATENT DOCUMENTS 2,994,776 A * 8/1961 Mott ............................ 376/118
4,298,805 A   11/1981 Dennis

OTHER PUBLICATIONS

Britton et al., "PATARA: Solid-State Neutron Readout Electronics with Pole-Zero and Complex Shaping and Gated Baseline Restorer for the SNS", 2006 IEEE Nuclear Science Symposium Conference Record 1-4244-0561 (2006 IEEE).*
Henderson et al., "SNS Parameters List", U.S. Department of Energy Document SNS 100000000-PL0001-R13, Jun. 2005, US DoE.*

* cited by examiner

*Primary Examiner* — Johannes P Mondt
(74) *Attorney, Agent, or Firm* — Jeremy Berman

(57) ABSTRACT

A method for operating a pulsed neutron generator includes adjusting a target current of the neutron generator to a preselected value. A parameter related to a neutron output of the neutron generator is measured. A target voltage of the neutron generator is adjusted to maintain the measured parameter within a predetermined range.

10 Claims, 5 Drawing Sheets

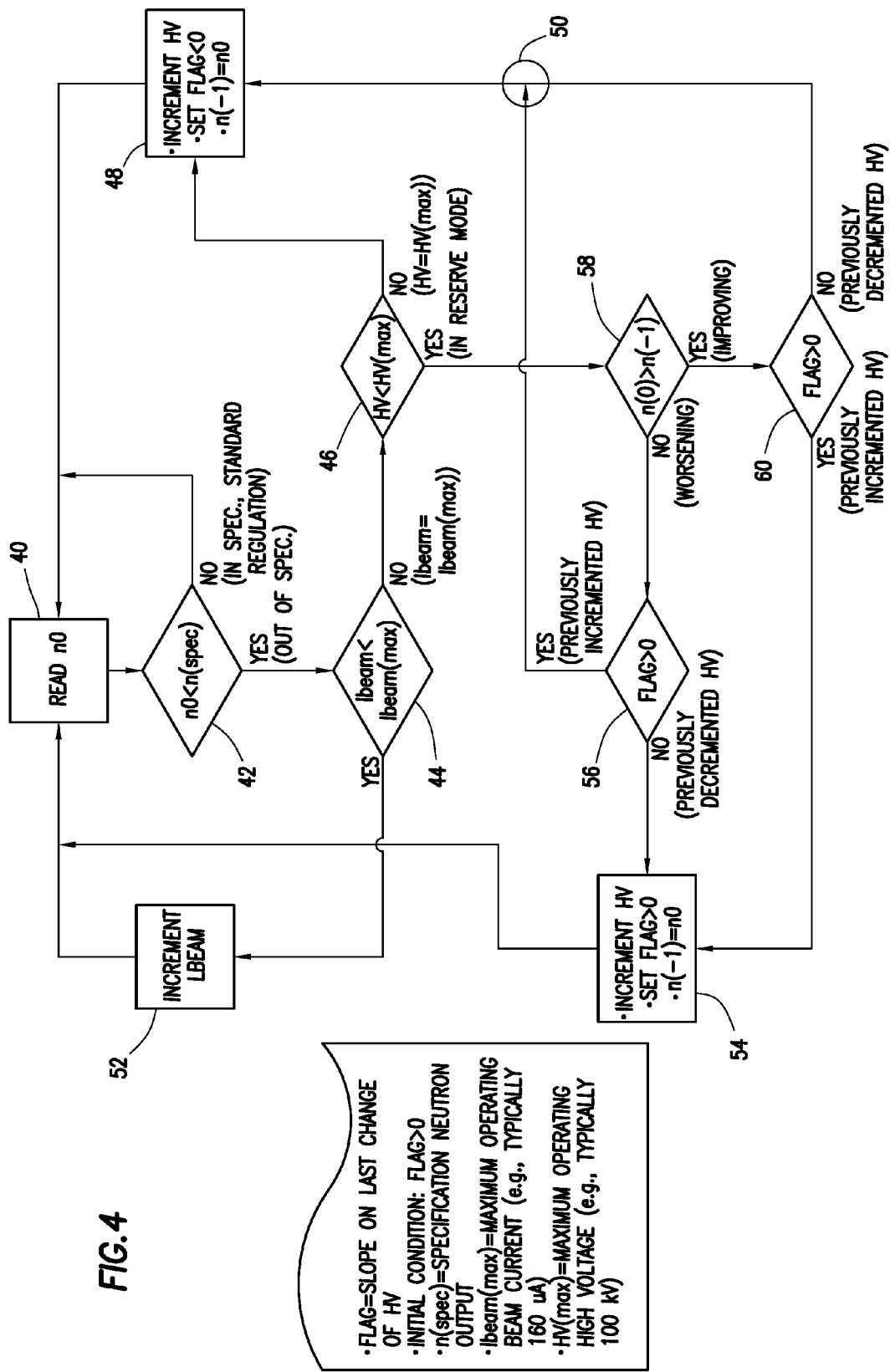

METHODS FOR CONTROLLING ION BEAM AND TARGET VOLTAGE IN A NEUTRON GENERATOR FOR IMPROVED PERFORMANCE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of neutron well logging instruments that use neutron generators. More specifically, the invention relates to methods for controlling operating parameters of a neutron generator in such instruments to optimize neutron output and neutron generator operating lifetime.

2. Background Art

Neutron well logging instruments are known in the art for evaluation of physical characteristics of subsurface formations penetrated by wellbores. Neutron well logging instruments typically include a source of neutrons having what is termed "high" energy, for example in a arrange of 2 to 14 million electron volts (eV), and one or more radiation detectors placed at selected distances from the neutron source. The neutrons from the source enter the formations surrounding the wellbore in which the instrument is disposed. The one or more radiation detectors count radiation events, for example, inelastic gamma rays, epithermal or thermal neutrons, or capture gamma rays. Numbers of such radiation events, and/or their time and energy spectral characteristics, are related to physical parameters of interest of the surrounding formations. Such parameters include, as non-limiting examples, fractional volume of pore space (porosity), and mineral composition of the rock grains making up the various formations.

Neutron well logging instruments are known to include isotopic (chemical) sources, which include one or more radioisotopes emitting neutrons at a more or less constant rate, and electronic neutron generators. Electronic neutron generators include a pulsed neutron generator that is configured to emit controlled duration pulses or "bursts" of neutrons. Other examples of electronic neutron generators provide continuous neutron generation.

Generally, neutron generators known in the art include a hermetically sealed envelope or tube that is substantially evacuated. A reservoir (which in some examples is embodied in a filament) in the tube includes adsorbed deuterium. The reservoir is controllably heated, typically by an electrical resistance heater. An ion generator or ion source is disposed in the tube, typically near one end of an accelerating column. When actuated with electrical power, the on generator ionizes the deuterium and/or tritium released by heating the reservoir. A target is disposed at the opposite end of the tube and is charged to high voltage relative to the ion generator so as to attract and accelerate the ions produced by the ion generator. Ions strike the target, which may in some neutron generators include tritium and/or deuterium therein, so as to create helium and free neutrons by a fusion reaction. For purposes of well logging, it is important that the number of neutrons in each burst, the burst timing, and the energy of such neutrons are well controlled. Two operating parameters of a pulsed neutron generator that are controllable to affect the neutron output are the ion beam current and the voltage applied to the target ("high voltage"). One example of a pulsed neutron generator and control system therefor is described in U.S. Pat. No. 4,298,805 issued to Dennis. Ion beam current is typically controlled by adjusting the current applied to the reservoir heating element (e.g., the filament). The greater the ion beam current, the greater the neutron output. Increasing the filament power (by increasing current and/or voltage) increases the filament temperature, and thus the number of gas molecules inside the tube available for ionization and acceleration to the target.

In general, a pulsed neutron generator should be operated at the maximum, reliable high voltage applied to the target that the electrical insulation surrounding the neutron generator tube and the tube itself can sustain. At such level of high voltage, a certain ion beam current will be necessary to achieve a nominal neutron output. At higher voltages, less ion beam current will be required for the same neutron output, which usually results in less erosion of the target, thus longer target life. Typical neutron generator regulation techniques provide that with decreasing neutron output, the ion beam current is increased (e.g., by increasing filament power), and vice versa, to compensate and maintain the desired neutron output. Pulsed neutron generator tubes are subject to high voltage leakage current. Leakage currents typically result from electrons leaving the high voltage electrodes (such as the target) and moving to a focusing or other lower voltage electrode disposed inside the tube. Such leakage current is an unavoidable result of the high voltage applied across the accelerator column, and the magnitude of such leakage current may depend on the age and physical condition of the neutron generator. Leakage current can also flow between high voltage electrodes outside the neutron generator tube, through insulating media or along surfaces of insulators. The total electrical current that must be provided by the high voltage power supply will be related to the sum of the ion beam current and the leakage currents. When the ion beam current plus the leakage current exceeds the maximum current available from the high voltage power supply, the leakage current may cause the numbers of neutrons produced by the pulsed neutron generator to decrease, and such decrease in neutron output can no longer be compensated by further increasing the ion beam current. Regulation of high voltage and ion beam current are complicated by the fact that leakage current is frequently not predictable or readily measurable. Thus, during operation of a pulsed neutron well logging instrument, intermittent events of excessive leakage current having variable duration may occur.

What is needed is a technique for controlling neutron generator ion beam current and high voltage that can provide optimum neutron output even if the leakage current becomes excessive.

SUMMARY OF THE INVENTION

A method for operating a neutron generator according to one aspect of the invention includes adjusting a target current of the pulsed neutron generator to a preselected value. A parameter related to a neutron output of the pulsed neutron generator is measured. A target voltage of the neutron generator is adjusted to the measured parameter within a predetermined range.

A method for well logging according to another aspect of the invention includes moving a well logging instrument through a wellbore drilled through subsurface formations.

The instrument includes a pulsed neutron generator. A target current of the pulsed neutron generator is adjusted to a current capacity of a power supply coupled to the target. A parameter related to a neutron output of the pulsed neutron generator is measured. A target voltage of the pulsed neutron generator is adjusted to maintain the measured parameter within a predetermined range. Radiation events related to interaction of neutrons from the generator with the formation and/or borehole are measured.

Other aspects and advantages of the invention will be apparent from the following description and the appended claims.

BRIEF DESCRIPTION OF THE DRAWINGS

FIG. 4 is a flow chart of one example of a method according to the invention.

DETAILED DESCRIPTION

Figure 1:
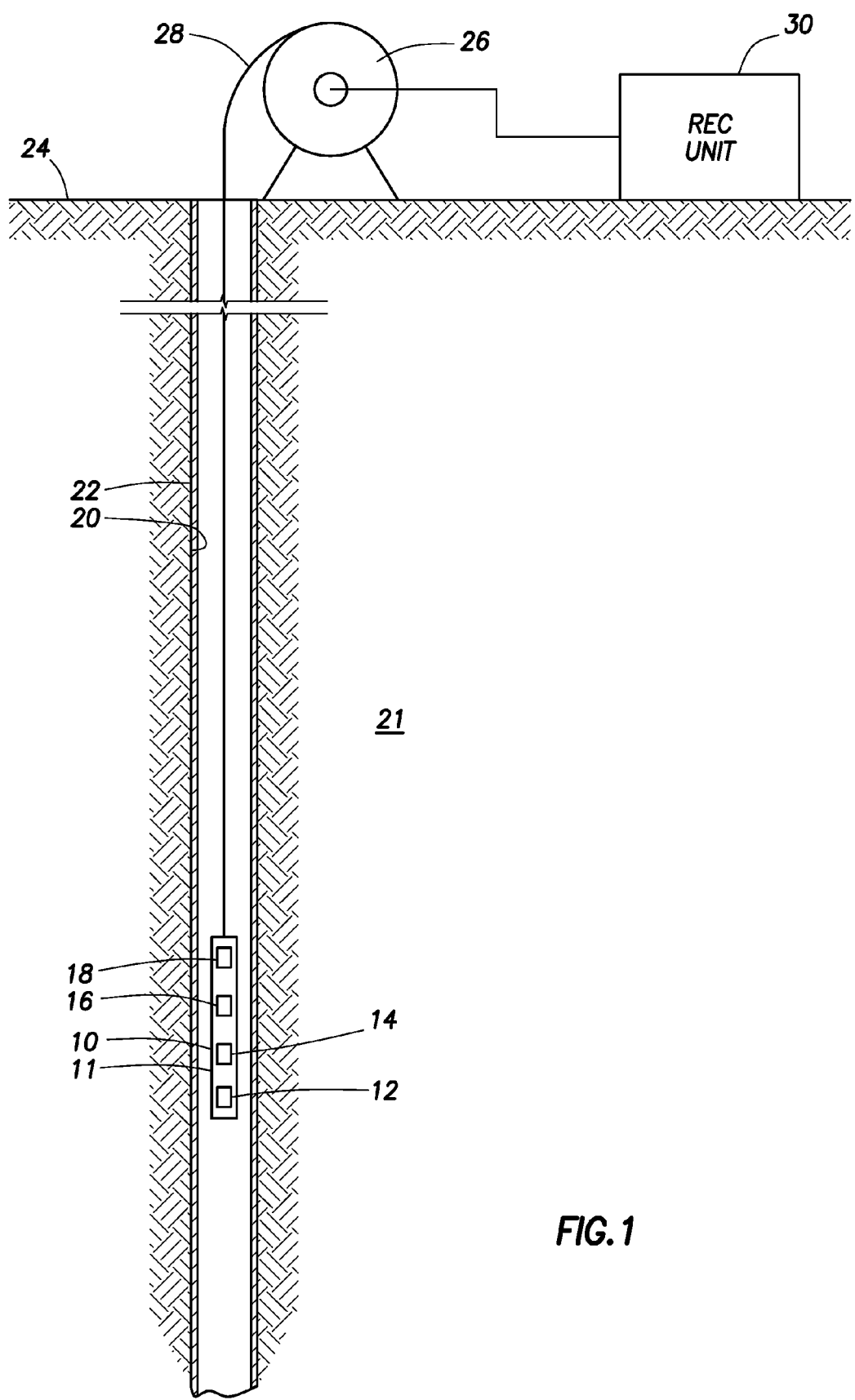
FIG. 1 shows an example of a pulsed neutron well logging instrument as it is used in a wellbore.

An example pulsed neutron well logging instrument as it is used in evaluating subsurface Earth formation is shown in FIG. 1. The well logging instrument 10 may be disposed in a sealed, pressure resistant housing 11 configured to move along the interior of a wellbore 20 drilled through subsurface formations 21. Depending on the type of well logging instrument, the wellbore 20 may include a pipe or casing 22 disposed therein. The instrument 10 may be moved along the wellbore by extending and retracting an armored electrical cable 28. The cable 28 may be extended and withdrawn using a winch 26 or similar spooling device known in the art. Electrical power to operate the instrument 10 may be provided by suitable circuits (not shown separately) in a recording unit 30 disposed at the Earth's surface 24 near the wellbore 20. Signals communicated from the instrument 10 to the recording unit 30 over the cable 28 may be decoded and interpreted in the recording unit 30.

The manner of conveyance in the wellbore 20 and the manner of supplying power and signal communication shown in FIG. 1 is known in the art as "wireline" conveyance, and such manner of conveyance is shown only for purposes of explaining one example implementation of the invention. It is to be clearly understood that the manner of conveyance of the instrument 10 is not a limit on the scope of the present invention. Other conveyance devices known in the art, non-limiting examples of which include coiled tubing, drill pipe ("logging while drilling"), production tubing and slickline, can also be used with a well logging instrument and method according to the various aspects of the invention.

The well logging instrument 10 can include within its housing 11 a pulsed neutron generator 12. Components of the pulsed neutron generator 12 will be further explained with reference to FIG. 2. In some examples a monitor detector 14 may be disposed proximate the generator 12 to detect some of the neutrons generated by the generator 12 prior to any interaction with the formations 21 outside the wellbore 20. Thus, the output of the monitor detector 14 may be directly related to the neutron output of the generator 12. One or more radiation detectors, one of which is shown at 16, may be disposed in the housing 11 at distance(s) from the generator 12 selected to respond to radiation events resulting from interaction of neutrons with the formations 21 outside the wellbore, and/or with the fluids (not shown) in the wellbore 20. The radiation detector(s) 16 may be any type known in the art to be used with a pulsed neutron well logging instrument, including thermal and epithermal neutron detectors, Geiger-Mueller gamma ray counters and scintillation crystal-type gamma ray counters. The type of radiation detector and the physical properties that affect the radiation detected by the radiation detector 16 are not limits on the scope of the present invention. In some examples, the output of the radiation detector(s) may be used to estimate the output of the generator 12 in addition to or in substitution of the monitor detector 14. Signals related to the output of the radiation detector 16 may be formatted into suitable signals for telemetry over the cable 28 by a controller 18 disposed in the housing 11. The controller 18 may also perform certain other functions, as will be explained in more detail below with reference to FIG. 2.

Figure 2:
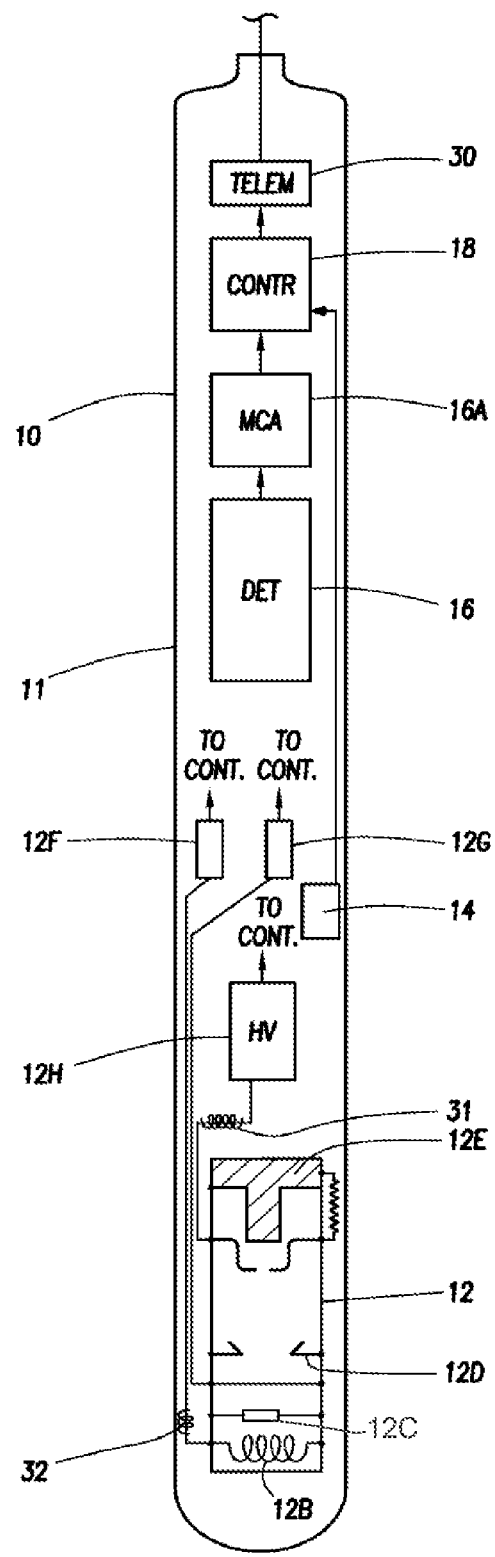
FIG. 2 shows the example instrument of FIG. 1 in more detail.

FIG. 2 shows the example instrument of FIG. 1 in more detail. The housing 11 as previously explained may include the pulsed neutron generator 12, the monitor detector 14, one or more radiation detectors 16 and a controller 18. In some examples, the radiation detector 16 may be a scintillation counter in which detected radiation events produce a flash of light having amplitude proportional to the energy of each detected radiation event. For such detectors, the output thereof may be conducted to a pulse height analyzer (sometimes referred to as a multichannel analyzer or "MCA") 16A so that the number of detected radiation events of known energy may be counted and used for evaluation of the subsurface Earth formations (21 in FIG. 1). The MCA 16A may also count the detected events indexed with respect to time. The controller 18 may be a microprocessor-based controller and may be programmed to execute a method according to the invention as will be further explained. The controller 18 may include devices (not shown separately) for controlling the output of a high voltage power supply 12H and a reservoir power supply 12F according to the invention. The controller 18 may also control operation of ionizer power supplies 12G to cause production of ions in the neutron generator 12, as explained above, to cause the neutron generator 12 to produce bursts of neutrons or continuous neutron output. Controlling the various power supplies 12F, 12G, 12H may be performed by the controller 18 to carry out methods according to the invention.

As explained in the Background section herein, the neutron generator 12 may include a sealed envelope or tube 12A that is substantially evacuated. A reservoir 12B that may be heated by an electrical resistance heater (not shown separately) may include therein adsorbed deuterium and/or tritium gas. When heated, the reservoir 12B releases some of the adsorbed the deuterium or tritium, typically at a rate related to the reservoir temperature, An ionizer 12C disposed in the tube 12A may cause the released gas to be ionized. When ionized, the deuterium or tritium gas may be drawn to a target 12E by a high voltage imparted between the target 12E and a focusing or other electrode 12D disposed in the tube 12A bounding the ion source. A fusion reaction, which may in some examples result from impact of the deuterium or tritium ions with deuterium or tritium adsorbed in the target 12E, results in production of helium and free neutrons. In some examples, as shown in FIG. 2, a current measuring circuit 31 may be included in the high voltage supply 12H circuit so that the amount of total electrical current drawn from the high voltage supply 12H may be monitored. In some examples, a current or voltage measuring circuit 32 may be included in the reservoir heater power supply 12F circuit so that a parameter related to the ion beam current may be monitored.

Figure 3A:
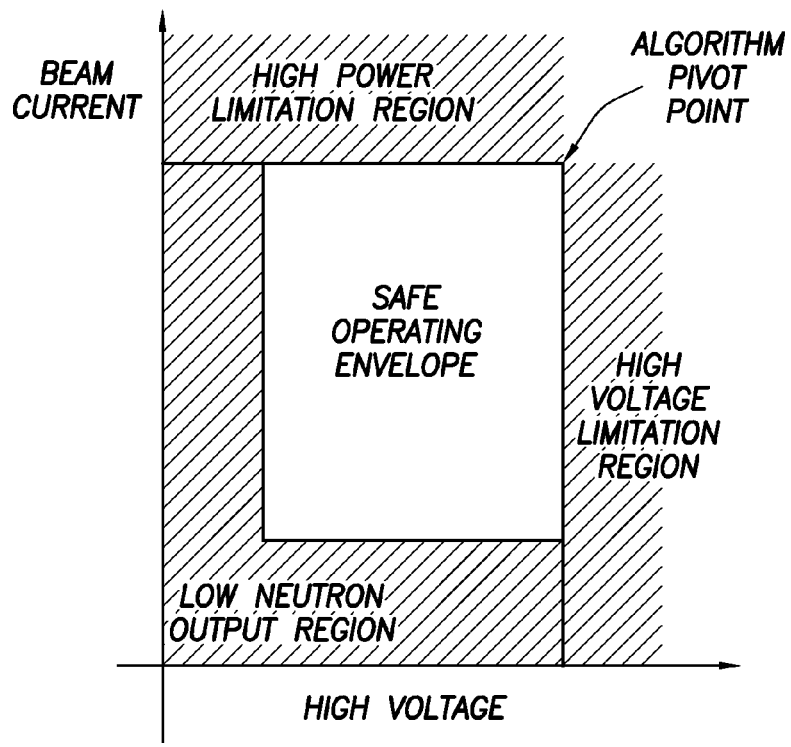
FIGS. 3A through 3E show various aspects of some relationships between target voltage, ion beam current and neutron output for a typical pulsed neutron generator that are taken into account in methods according to the invention.

Relationships between the various operating parameters for a pulsed neutron generator such as the one shown in FIG. 2 and its expected output of neutrons will now be explained with reference to FIGS. 3A through 3E in order to better explain principles of the present invention. FIG. 3A is a graphical representation of a pulsed neutron generator high voltage and ion beam current operating parameter space. The following regions are identified in FIG. 3A: (a) high power limitation region corresponding to limitations on the amount of power available from the high voltage power supply (12H in FIG. 2); (b) a high voltage limitation region corresponding to the limitations of the high voltage electrical insulation within the instrument (10 in FIG. 2) and the internal electrical insulation limits of the neutron generator (12 in FIG. 2); and (c) a low neutron output region corresponding to insufficient neutron output relative to the specification for the particular neutron generator.

Figure 3B:
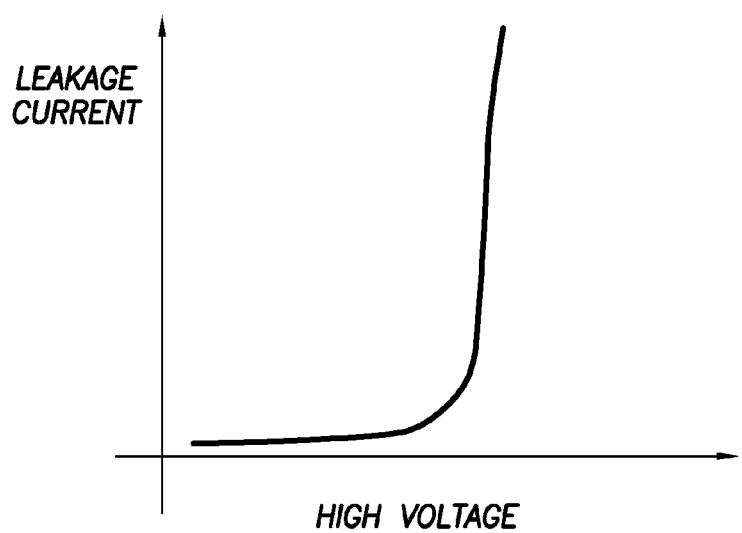

FIG. 3B is a graphic representation of the high voltage leakage current with respect to high voltage applied to the target (12E in FIG. 2). The graph in FIG. 3B shows a strong exponential variation. Such variation indicates that below a certain, lower voltage applied to the target will result in substantially lower leakage current.

Figure 3C:
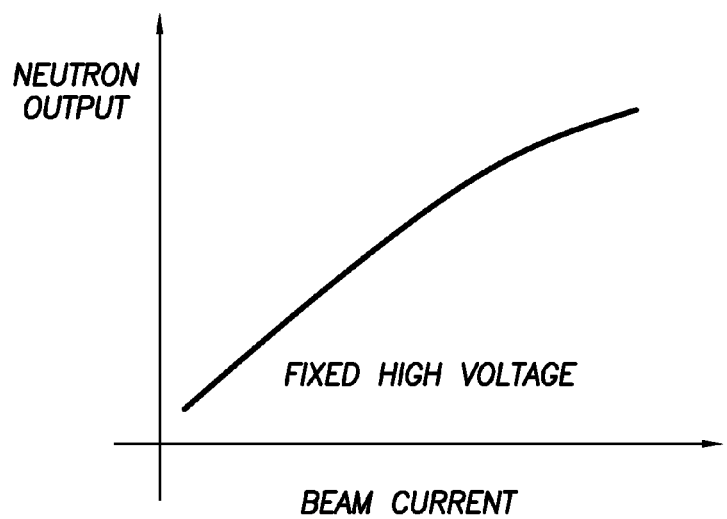

FIG. 3C shows a graphic representation of the output of the neutron generator with respect to ion beam current, wherein the target voltage remains substantially constant. FIG. 3C shows that in general, neutron output is linearly related to ion beam current (and thus to filament current). At a certain point on the graph of FIG. 3C, it is apparent that neutron output from the generator no longer increases linearly with further increases in ion beam current. In some examples, the point at which the linearity of the neutron generator output with respect to ion beam current breaks down may be increased by increasing the ionizer current. In some examples, the ionizer may include a heated cathode (not shown) which emits electrons on application thereto of electrical potential. The number of emitted electrons may be increased in such examples by increasing the cathode temperature (e.g., by increasing heater current). Such control is similar to the manner in which target current is controlled in an x-ray generator tube.

Figure 3D:
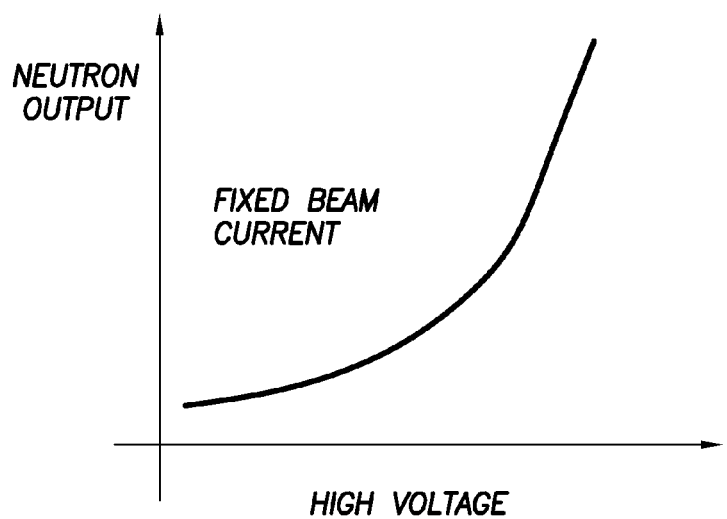

FIG. 3D shows a graphic representation of neutron generator output, for a fixed ion beam current, with respect to target voltage. The neutron generator output with respect to high voltage for fixed beam current, shows a weakly exponential relationship. It is the relationship between target voltage and neutron generator output shown in FIG. 3D that is the basis of pulsed neutron generator operating techniques known in the art prior to the present invention. Such techniques generally provided for operating the pulsed neutron generator at the highest possible voltage consistent with the insulation system and the total available current from the HV power supply.

Figure 3E:
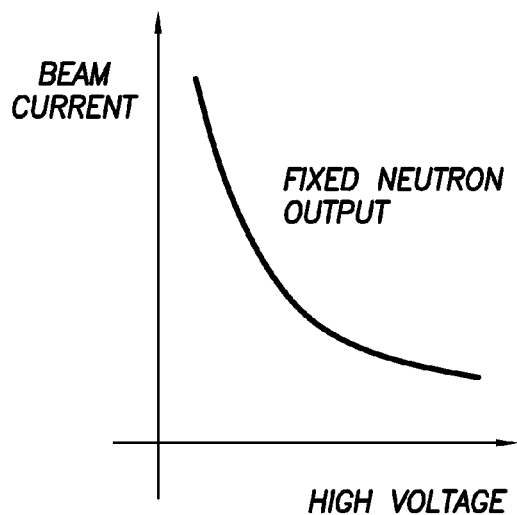

FIG. 3E shows a graphic representation of the relationship between ion beam current and target voltage for a fixed value of neutron output. The relationship shown in FIG. 3E is also weakly exponential.

Methods according to the invention take into account the characteristic relationships of neutron output (or yield) with respect to target high voltage, the neutron output with respect to ion beam current, and the high voltage leakage current with respect to target high voltage shown graphically in FIGS. 3A through 3E.

High voltage leakage currents, as explained in the Background section herein, include electron current flowing unpredictably and uncontrollably along and/or through high voltage insulators to a lower voltage electrode, or between a high voltage electrode and a lower voltage electrode. Typically, the magnitude of the high voltage leakage current is very sensitive to the level of high voltage, as explained above with reference to FIG. 3B. As a result of such relationship, small decreases in target high voltage typically result in large decreases in high voltage leakage current, and vice versa. Because leakage current does not contribute to neutron output, its presence will lead to an increase in the total load current on the high voltage power supply (which total load current is typically the sum of the ion beam current and the leakage current) or it will lead to a drop in neutron output if the total current is fixed, because some ion beam current is diverted to leakage. Also as explained above, leakage currents may be intermittent and their magnitudes may be unpredictable. Thus, in some situations with the present invention the ion beam current may be operated substantially at the maximum current available from the HV power supply. To compensate changes in neutron output, according to some examples of the present invention, the target voltage may be adjusted (e.g., decreased) to increase neutron output.

To maintain a constant neutron output during a leakage current "event", in methods known in the art prior to the present invention, the neutron generator ion beam current typically would be increased in relation to the amount of high voltage leakage current present. Such increase in ion beam current (adjusted, e.g., by increasing the reservoir heater current) is generally possible up to the maximum load current which can be provided by the high voltage ("HV") power supply (12H in FIG. 2), with due consideration to other ion beam current limiting factors such as target depletion of adsorbed tritium from excessive heating, etc. Once the HV power supply load current limit is reached, however, the neutron output will typically decrease with any additional increases in HV leakage current, as previously explained.

To reduce the effect of high voltage leakage current on the neutron generator output, in a method according to the invention, once the maximum high voltage power supply load current, or other predetermined current value is reached, the instructions programmed into the controller (18 in FIG, 2) may include decreasing the high voltage applied to the target. Reducing the high voltage may increase the neutron generator output as a result of an increase in effective ion beam current. Such increase in effective ion beam current corresponds to a decrease in high voltage leakage current. The expectation is that any reduction in neutron generator output due to lower target high voltage will he offset by an increase in effective ion beam current because the leakage current will be reduced (see FIG. 3B) Subsequent retesting or determining of the level of neutron generator output with respect to incremental changes in target high voltage can ensure that the neutron generator (12 in FIG. 2) is operating at an optimal high voltage level with respect to neutron output and the amount of leakage current.

An alternative implementation may be used in instances where the reliability of the neutron generator with respect to ordinary high voltage is uncertain. To maximize the useful life and the performance of the neutron generator in such instances, the neutron output of the neutron generator can be controlled by adjusting the high voltage applied to the target. A fixed operating beam current is typically selected so that it is high enough to enable sufficient neutron output by the neutron generator, and conversely far enough below the ion beam current limitation shown in FIG. 3A so as to leave some operating margin (operating "reserve" for end of the lifetime of the neutron generator). Using a fixed ion beam current, the target high voltage is adjusted to maintain substantially constant neutron output. The neutron output relationships for beam and high voltage described above apply to such control procedure. The higher the fixed ion beam current is set, the lower the necessary target voltage for a selected neutron generator output and leakage current. The result of such operation may be to lower the stresses on the high voltage insulation system (both internal and external to the neutron generator). This reduced stress on the insulation may prolong the life of the neutron generator.

Where large leakage current exists, which can reduce neutron output, the foregoing fixed beam current/variable high voltage control procedure may provide for increasing the target high voltage, thus further increasing the leakage current Further increases of leakage current may reduce neutron generator output, contrary to what may be required under the circumstances. In such instances, in some examples the presence and/or magnitude of leakage current can be detected, and the instructions programmed into the controller (18 in FIG, 2) can operate the high voltage power supply to decrease the target voltage when leakage current is determined to be excessive. Such operating control may result in higher neutron generator output, because excessive leakage will he reduced if detected and corrected. Methods for detecting leakage current can include: (1) high voltage dithering—adjusting the target voltage in small positive and negative steps to determine if the neutron generator output is positively or negatively correlated to the target voltage. The amount of anti-correlation may indicate the magnitude of the leakage current; (2) direct measurement—typically, the ion source front (e.g., electrodes 12C in FIG. 2) electrode, facing the target, receives the bulk of leakage current along the high voltage path. Direct sensing of the current can be used to determine the presence and/or magnitude of HV leakage. One implementation may include a current measurement circuit; (3) reservoir heater (filament) current and HV load current measurement. An unexpected drop in reservoir heater (filament) current can indicate that the gas pressure in the neutron generator has dropped, suggesting that the ion beam current has dropped correspondingly. If the load current on the high voltage power supply has not dropped correspondingly, such can be an indication of HV leakage; (4) reservoir heater current noise—by its nature, current leakage in the high voltage circuit tends to be noisy, often growing noisier as the leakage increases. The reservoir heater current can he used to maintain a fixed high voltage load current (by reason of maintaining a fixed ion beam current), and is typically only slowly time varying. If the measured reservoir heater current is noisy (not smoothly varying with time), then such current noise may indicate the presence of current leakage. The magnitude of the reservoir heater current noise can be correlated to the magnitude of the current leakage, i.e., the heater current noise can be used to estimate the magnitude of the leakage current. Voltage in the heater circuit may also be measured to obtain a measurement related to heater current. For purposes of determining noise in the heater current, it is only necessary to measure a parameter that is related to the current.

Having explained general principles of methods according to the invention, an example implementation of a method will be explained with reference to the flow chart in FIG. 4. When the pulsed neutron well logging instrument is initially energized, the programming in the controller (18 in FIG. 2) may cause generation of neutrons by the neutron generator as explained above. A process indicator "flag" may be initially set to a positive number (F>0). The flag may he related to the change in neutron generator output with respect to change in target voltage. A specification neutron output from the neutron generator, which may be related, for example, to a counting rate of the monitor detector (see 14 in FIG. 2), or other radiation detector, may be entered into the input data to the controller. Maximum values for the load current on the high voltage power supply and the target voltage may also be entered into the controller. Such data entry may form part of the initial programming of the controller when the instrument is manufactured, or may be programmed subsequent to manufacture. Upon initially powering the instrument, the output of the monitor detector or other radiation detector may be interrogated, at 40, to determine, at 42, whether the output of the neutron generator is below specification or is within specification. If the monitor detector output indicates below specification neutron output from the generator, then if the high voltage ("HV") load current is below the maximum value, at 44, then at 52 the reservoir heater (filament) current may be increased by a selected increment. The monitor detector output is once again measured at 40. The foregoing process "loop" may be repeated until either the monitor detector output indicates within specification neutron generator output, or at 44 the HV load current is at a maximum capacity of the HV power supply or is at some other predetermined value. If the HV load current is at the predetermined value, then at 46 the HV is measured and if the HV is at the maximum allowable value related to the insulation system, or other predetermined value, at 48 the HV is decreased by a selected amount (decrement) and the flag is set to a negative number (F<0). The monitor detector output is once again measured and the foregoing process loop is repeated.

If at 46 the HV is determined to be at its maximum or other predetermined value, then at 58 the present monitor detector measurement is compared to the immediately previous monitor detector measurement. If the monitor detector measurement has increased, then at 60 the flag is measured. If the flag is a positive number, then the process continues at 54, where the HV is increased by a selected amount, the flag is set to a positive number, and the monitor detector is interrogated once again at 40. If at 56 the flag is a negative number, then the process returns to block 48, wherein the HV is decremented and the flag is set to a negative number.

If at 58 the present monitor detector measurement is not greater than the immediately previous monitor detector measurement, then at 56 the value of the flag is interrogated. If the flag is a positive number, the process returns to block 48. If the flag is a negative number, then the process returns to block 54.

In some examples, and as suggested above, a separate "monitor" detector may not be used. In such examples, a measurement related to the neutron output of the neutron generator may be provided by measurements made by the radiation detector (16 in FIG. 2). An example implementation would include adjusting the output of the neutron generator as described above so that the counting rate from the radiation detector remains within a selected range. It is also possible to attempt to coarsely regulate neutron output without a neutron or gamma-ray detector by compensating for leakage current. This can be done using a direct leakage current measurement or by measuring reservoir current (or power) noise. Such a noise measurement can be correlated with the magnitude of leakage current.

Methods for operating a pulsed neutron generator according to the various aspects of the invention may provide more stable neutron output even during leakage current events, may reduce the incidence and severity of leakage current events, and may enhance neutron generator lifetime.

While the invention has been described with respect to a limited number of embodiments, those skilled in the art, having benefit of this disclosure, will appreciate that other embodiments can be devised which do not depart, from the scope of the invention as disclosed herein. Accordingly, the scope of the invention should be limited only by the attached claims.

What is claimed is:

1. A method for operating a pulsed neutron generator, comprising:
    applying a target current to a target within a neutron tube of the pulsed neutron generator by a power supply;
    detecting leakage current within the pulsed neutron generator by measuring a parameter related to the leakage current, at least a portion of the leakage current representing a current flowing between the target and an electrode upstream of the target;
    adjusting the target current applied to the target to a value that is proportional to the amount of leakage current present, up to a maximum load current provided by the power supply;
    measuring a parameter related to a neutron output of the neutron generator;
    reducing a target voltage of the pulsed neutron generator, based upon the parameter related to the leakage current, to reduce the leakage current, including the portion of the leakage current representing the current flowing between the target and the electrode, to a nonzero value while maintaining the measured parameter related to neutron output of the neutron generator at a substantially constant rate;
    determining if the target voltage is at a limit value;
    decreasing the target voltage from the limit value if the measured parameter indicates the neutron output has decreased and the target voltage is at the limit value; and
    increasing the target voltage if a present value of the measured parameter indicates a decrease in neutron output from a prior value of the measured parameter.

2. The method of claim 1 wherein the leakage current parameter comprises a portion of the current applied to a source gas reservoir heater.

3. The method of claim 2 further comprising determining a noise level in the reservoir heater current.

4. The method of claim 1 wherein the leakage current parameter comprises current flowing through an electrode in the neutron generator positioned to be sensitive to leakage current.

5. The method of claim 1 wherein the parameter related to neutron output comprises measurements made by a monitor detector responsive to neutrons generated by the neutron generator.

6. A method for well logging, comprising:
    moving a well logging instrument through a wellbore drilled through subsurface formations, the instrument including a pulsed neutron generator;
    applying a target current to a target within a neutron tube of the pulsed neutron generator;
    detecting leakage current within the pulsed neutron generator by measuring a parameter related to the leakage current, at least a portion of the leakage current representing a current flowing between the target and an electrode upstream of the target;
    adjusting a target current applied to the target to value that is proportional to the amount of leakage current present, up to a maximum load current provided by the power supply;
    measuring a parameter related to a neutron output of the pulsed neutron generator;
    reducing a target voltage of the pulsed neutron generator, based upon the parameter related to the leakage current, to reduce the leakage current, including the portion of the leakage current representing the current flowing between the target and the electrode, to a nonzero value while maintaining the measured parameter related to the neutron output of the pulsed neutron generator at a substantially constant rate;
    measuring radiation events related to interaction of neutrons from the generator with at least one of the formations and the wellbore;
    determining if the target voltage is at a limit value;
    decreasing the target voltage from the maximum if the measured parameter indicates the neutron output has decreased and the target voltage is at the limit value; and
    increasing the target voltage if a current value of the measured parameter indicates a decrease in neutron output from a prior value of the measured parameter.

7. The method of claim 6 wherein the leakage current parameter comprises a portion of the current applied to a source gas reservoir heater.

8. The method of claim 7 further comprising determining presence of noise in the source gas reservoir heater current.

9. The method of claim 6 wherein the leakage current parameter comprises current flowing through an ionization electrode in the pulsed neutron generator.

10. The method of claim 6 wherein the parameter related to neutron output comprises measurements made by a monitor detector responsive to neutrons generated by the neutron generator.

* * * * *